United States Patent
Certain

(10) Patent No.: US 7,941,250 B2
(45) Date of Patent: May 10, 2011

(54) METHOD AND A DEVICE FOR OBTAINING A PREDICTIVE VERTICAL SPEED OF A ROTORCRAFT

(75) Inventor: Bernard Certain, Aix en Provence (FR)

(73) Assignee: Eurocopter, Marignane Cedex (FR)

( * ) Notice: Subject to any disclaimer, the term of this patent is extended or adjusted under 35 U.S.C. 154(b) by 349 days.

(21) Appl. No.: 12/238,843

(22) Filed: Sep. 26, 2008

(65) Prior Publication Data
US 2009/0093919 A1  Apr. 9, 2009

(30) Foreign Application Priority Data
Sep. 27, 2007 (FR) ...................... 07 06784

(51) Int. Cl.
*G06F 17/00* (2006.01)
(52) U.S. Cl. ............. 701/7; 701/14; 340/946; 340/945; 702/144
(58) Field of Classification Search ............ 701/79, 701/14, 7, 3; 340/961, 968, 949; 702/144
See application file for complete search history.

(56) References Cited

U.S. PATENT DOCUMENTS

| | | | |
|---|---|---|---|
| 4,012,626 A * | 3/1977 | Miller et al. | 701/218 |
| 4,250,746 A | 2/1981 | Vassie et al. | |
| 4,490,794 A * | 12/1984 | Griffith et al. | 701/8 |
| 5,349,347 A | 9/1994 | Muller | |
| 6,400,283 B1 * | 6/2002 | Berlioz et al. | 340/975 |
| 6,683,541 B2 * | 1/2004 | Staggs et al. | 340/961 |
| 7,496,433 B1 * | 2/2009 | Marze | 701/5 |
| 7,616,130 B2 * | 11/2009 | Astruc et al. | 340/946 |
| 2005/0085959 A1 | 4/2005 | Feyereisen | |

FOREIGN PATENT DOCUMENTS
FR  0 006 773  1/1980

OTHER PUBLICATIONS

French Search Report, mailed Jun. 11, 2008, corresponding to French patent application No. FR 07/06784, filed on Sep. 27, 2007.

* cited by examiner

*Primary Examiner* — Thomas G Black
*Assistant Examiner* — Marthe Marc Coleman
(74) *Attorney, Agent, or Firm* — Brooks Kushman P.C.

(57) ABSTRACT

A method and a device for obtaining a predictive vertical speed of a rotorcraft, the device constituting a predictive vertical speed indicator (1) that includes at least:
first elements (1') for measuring the instantaneous vertical speed v of a rotorcraft;
second elements (2) for measuring the instantaneous proper airspeed $V_P$ of a rotorcraft; and
third elements (3) for calculating the predictive vertical speed $v_{AP}$ of a rotorcraft, the third elements being connected firstly to the first and second elements via respective first and second connections (l1, l2) and containing in memory predetermined values for the minimum-power speed $V_Y$ and a characteristic constant $\bar{k}$ that are constants relating to the rotorcraft of a given type of rotorcraft.

24 Claims, 1 Drawing Sheet

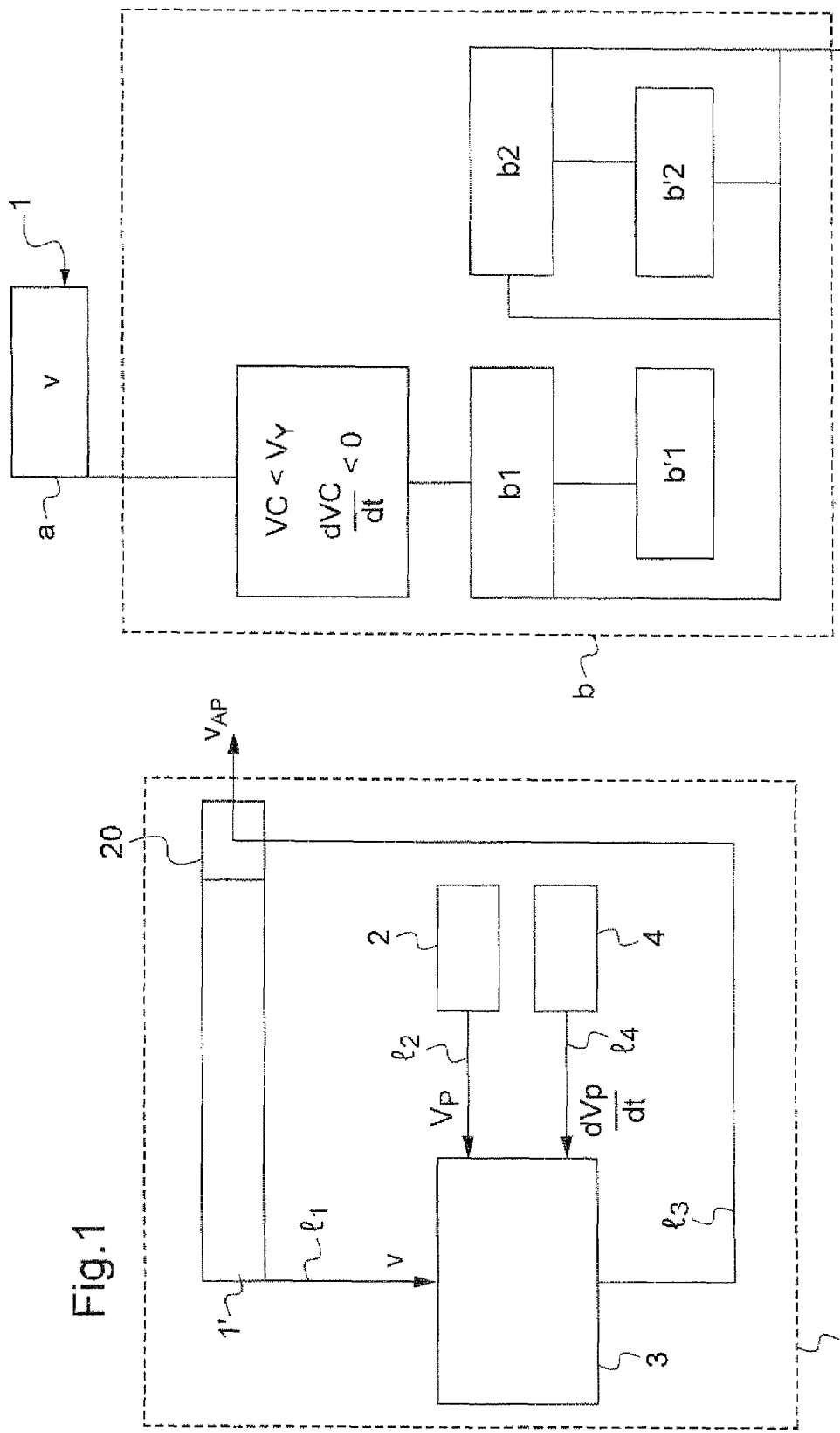

METHOD AND A DEVICE FOR OBTAINING A PREDICTIVE VERTICAL SPEED OF A ROTORCRAFT

TECHNICAL FIELD

The present invention relates to a method of obtaining a predictive vertical speed of an aircraft, in particular a rotorcraft. The invention also relates to a predictive vertical indicator device implementing said method.

BACKGROUND OF THE INVENTION

In order to able to fly a rotorcraft, the pilot makes use of a plurality of on-board instruments, and in particular of a vertical speed indicator. This indicator determines the instantaneous vertical speed (vertical speed upwards or downwards) of the rotorcraft and informs the pilot.

The vertical speed indicator relies on the principle of measuring variation in atmospheric pressure while climbing or descending. By way of example, this can be done by an indicator constituted by a pressure gauge capsule connected to a thermally insulated tank, the assembly being put into communication with the surrounding air (ambient atmosphere) via a calibrated capillary tube.

The variable speed indicator is controlled by the pressure difference between the surrounding air (atmospheric pressure or static pressure within the indicator but outside the capsule) and the pressure inside the capsule via the connection provided by the capillary tube acting as an air intake of determined bore size. The capillary tube needs to be calibrated so that the deformation of the capsule represents the pressure difference between the local pressure at a given instant and the local pressure at the immediately preceding instant. Consequently, the capillary tube needs to be sufficiently fine to ensure that while climbing or descending the static pressure (ambient atmosphere) differs sufficiently from the pressure inside the capsule.

In other words, the capillary tube imposes a certain delay in atmospheric pressure becoming established throughout the capsule-and-tank assembly.

Given the principle on which it operates, it can readily be understood that the indications given by a vertical speed indicator are not instantaneous whenever there is an upward or downward change in the flightpath of an aircraft in flight.

Since the vertical speed indicator responds only to pressure variations, it naturally results during level flight that the pressures inside and outside the indicator equalize via the capillary tube so that the indicated rate of climb or descent becomes equal to zero.

In addition, it is essential for the pilot to be aware of speed $V_A$ relative to air, generally referred to as "airspeed". This is measured and displayed by an airspeed indicator. That instrument is a differential pressure gauge that measures the difference between the static pressure and the total pressure of the air flow past corresponding pressure intakes.

The static pressure (ambient pressure at the static pressure intake) is independent of the airspeed of the aircraft.

The total pressure (or "stagnation pressure") is obtained from an intake for receiving the total pressure of the air flow.

Under such conditions, the airspeed indicator also includes an aneroid capsule that deforms to a greater or lesser extent as a function of the magnitude of the difference between the total pressure and the static pressure.

In general, the static and total pressure intakes are grouped together on a single probe known as a Pitot tube. A Pitot tube is substantially streamlined and cylindrical, with a leading end that is generally hemispherical. The Pitot tube is placed on the aircraft so that firstly the total pressure intake is situated at the extreme leading end of the cylindrical body, and secondly the static pressure intake is radial and located behind the total pressure intake.

In the special case of a rotorcraft, the static pressure intake is in principle located along the fuselage whereas the total pressure intake is situated at the leading end of a pole of greater or lesser length.

Thus, and in application of Bernoulli's theorem, which theorem is valid in particular at the forward speeds of a rotorcraft, said difference is equal to a dynamic pressure (proportional to the square of the airspeed of the aircraft) from which the indicated airspeed of the aircraft is deduced.

This speed is delivered an on-board instrument, i.e. an indicator for constituting an airspeed installation so that the indicated speed $V_A$ corresponds:
  on the ground, to the speed of the aircraft relative to the ambient atmosphere; and
  at altitude (in flight), to the equivalent airspeed, i.e. the product of the true airspeed $V_V$ (or flightpath speed) multiplied by the square root of the relative density $\sigma$ of the air, itself equal to the quotient of the density $\rho$ of air at the altitude in question divided by the density $\rho_0$ of air at ground level in a "standard atmosphere", i.e.:

$$V_A = V_V \sqrt{\sigma} = V_V \sqrt{\frac{\rho}{\rho_0}}$$

In reality, the indicated airspeed differs from the equivalent airspeed because of instrument error. Consequently, the indicated airspeed needs to be corrected by calibrating the airspeed installation so as to correspond to the corrected speed or calibrated airspeed VC that is close to but different from the equivalent airspeed.

Such an instrument is calibrated solely for "standard atmosphere" conditions at sea level. In other words, the indicated speed is, in fact, equal to the speed relative to the air only if the pressure is 101,325 pascals and if the temperature is 15 degrees Celsius ($\rho = \rho_0$).

When the actual atmosphere is significantly different from the standard atmosphere, a correction is introduced based on "density altitude" that need not be described herein.

It is important to observe that traditional devices with a Pitot tube and a static pressure intake present sensitivity that tends to zero when the airspeed of the aircraft decreases.

Furthermore, for reasons of clarity, if a proper airspeed $V_P$ is defined as being equal to the horizontal component of the true airspeed, i.e. $V_V \cdot \cos\theta$ where $\theta$ is the slope angle of the flightpath of the aircraft. Thus, the vector $\vec{V_P}$ and the vector $\vec{V_W}$, i.e. the horizontal component of the wind, produce a geometrical resultant corresponding to the ground speed vector $\vec{V_S}$ that is fundamental for navigation purposes. Naturally, the true airspeed $V_V$ and the proper airspeed $V_P$ are equal in level flight. Ignoring instrument errors, it is thus possible to assume in level flight that the calibrated airspeed VC is equal to the product of the proper speed $V_P$ multiplied by $\sqrt{\sigma}$, i.e.:

$$VC = V_P \sqrt{\sigma}$$

Furthermore, with rotorcraft, first and second flying speed regimes are defined. A flying speed at the boundary between those two speed regimes is referred to as the "minimum-power" speed and is equal to about 65 knots (kt), for example. It corresponds to the lowest level of power needed for level flight, which level is referred to as the "minimum" power. This is a minimum presented by a curve plotting the power required for a rotorcraft to fly in level flight as a function of its forward speed. This necessary power is the sum of:

the induced power associated with the lift that needs to be produced, and equal to the product of the so-called "induced" speed multiplied by the dynamic lift: this power level decreases with increasing forward speed of the rotorcraft;

the profile power due to the profile drag of the blades of the main rotor, which power varies with varying blade profile: this power level increases with increasing forward speed;

the fuselage power due to the drag of the fuselage: this power level increases rapidly as a function of speed, substantially as a function of speed raised to the third power; and power losses due in particular to the transmission of power from the engine to the main and tail rotors, to cooling, to driving accessories: these power losses increase with increasing forward speed of the rotorcraft.

Thus, the first speed regime applies when the calibrated airspeed VC of the rotorcraft is greater than the minimum-power speed $V_Y$. In this regime the power required increases with increasing airspeed and corresponds to flight that is stabilized.

In contrast, the second speed regime applies below said minimum-power speed. In this regime rotorcraft flight suffers from instability. In this second speed regime, the calibrated airspeed is low and the power required increases as the speed of the rotorcraft decreases. Airspeed indicator measurements then become less and less reliable as the forward speed of the rotorcraft decreases. In addition, the measured instantaneous vertical speed is approximate, as explained above, because of the delay associated with the inertia of a vertical speed indicator.

Furthermore, a phenomenon known as "uplift" can falsify interpretation of the indications given by a vertical speed indicator.

Usually, the uplift phenomenon is a natural phenomenon involving air moving towards a higher altitude.

Thus, when the pilot causes the nose of the rotorcraft to rise, even only a little, and possibly instinctively, but without changing the instantaneous engine power (energy) of the rotorcraft, the vertical speed indicator begins by indicating a vertical speed that is positive.

In the short term, the longitudinal attitude of the fuselage increases and the rotorcraft tends to climb. However the total energy of the rotorcraft is the sum of its kinetic energy plus its potential energy. Since power is being maintained constant, increasing potential energy results in decreasing kinetic energy decreases, so the rotorcraft slows down.

Unfortunately, the pilot is unaware of the loss of speed of the rotorcraft, believing that advantage is being taken of the natural phenomenon of uplift. The pilot therefore does not remedy this loss of speed by increasing the power of the rotorcraft.

Furthermore, as explained above, such slowing down within the second regime of speeds needs to be accompanied by an increase in the amount of power.

As a result, vertical speed drops off suddenly and becomes highly negative, since the pilot has not increased the power being delivered, as is required because of the decrease in forward speed. The rotorcraft thus begins to drop quickly and possibly dangerously in a manner that the pilot does not foresee since only a few instants previously the vertical speed indicator was indicating a positive vertical speed.

In addition, when flying without visibility, the pilot needs to rely completely on the information provided by the instruments available in the instrument panel, including the vertical speed indication. If an emergency situation arises, the pilot may be caused to respond hurriedly. Such a hasty reaction can furthermore be accentuated by the said information becoming available rather late. The pilot may then commit piloting errors that can lead to an accident. This can happen if the pilot, worried by the presence of a nearby obstacle, acts involuntarily by reflex on the cyclic pitch stick without also increasing engine power. This leads to the rotorcraft taking on a slightly nose-up attitude followed by a rapid loss of altitude that is extremely dangerous if the rotorcraft is flying close to the ground or to water.

Furthermore, it should be observed that document EP 0 006 773 describes a method for determining a predictive speed for an aerodyne.

OBJECTS AND SUMMARY OF THE INVENTION

An object of the present invention is to remedy those drawbacks and to propose a method of obtaining a predictive vertical speed for a rotorcraft that makes it possible to have pertinent information available for calmly monitoring the aircraft in complete safety regardless of external conditions. In particular, the method is implemented by means of a vertical speed indicator adapted for this purpose, referred to herein as a predictive vertical speed indicator.

According to the invention, the method of obtaining a predictive vertical speed $v_{AP}$ of a rotorcraft, i.e. an evaluation of the vertical speed that the rotorcraft is going to reach after a given length of time without any change in its flightpath, is remarkable wherein the following steps are performed in succession:

a) measuring the instantaneous vertical speed $\underline{v}$ of the rotorcraft;

b) determining a corrective vertical speed depending on a predictive term; and c) adding the corrective vertical speed to the instantaneous vertical speed to obtain said predictive vertical speed $v_{AP}$.

As a result, the pilot has access to a predictive vertical speed enabling the pilot to anticipate the maneuvers that need to be performed so as to avoid any engagement of the rotorcraft in a critical situation.

Preferably, the instantaneous vertical speed v is supplied by a conventional vertical speed indicator that, in accordance with the invention, delivers the predictive vertical speed to the readout of said indicator, thus transformed into a predictive vertical speed indicator.

Thus, the method of obtaining a predictive vertical speed serves to obtain a safely time window during which the pilot can anticipate the corrective actions appropriate to the above-specified situations.

In addition, this anticipation takes account of the delay inherent to the intrinsic operation of the on-board instrumentation, i.e. the vertical speed indicator and possibly the airspeed indicator.

An anticipation time window, corresponding to the time needed by the pilot for performing a maneuver, is predetermined. This time is evaluated by the person skilled in the art as being substantially 10 seconds.

Step b) includes a step b1) during which a first correction is determined for the instantaneous vertical speed measurement v as a function of the instantaneous proper speed $V_P$, the predictive proper speed $V_{PP}$, the minimum-power speed $V_Y$, the instantaneous vertical speed $\underline{v}$ as measured by a vertical speed indicator, and a constant $\underline{k}$ that is characteristic of a rotorcraft of a given type of rotorcraft.

This characteristic constant k is determined by testing and on the basis of a linear approximation that corresponds to a proportionality ratio between powers and the vertical speed of the rotorcraft, independently of the mass of the rotorcraft, given by:

$$v = k\left(\frac{W}{W_n} - 1\right)$$

with the approximation:

$$\frac{W_n}{W_{VY}} = 2 - \frac{V_P}{V_Y}$$

In these relationships, $Wv_1$ and $W_n$ designate the powers needed to fly level respectively at the minimum-power speed $V_Y$ and at the proper speed $V_P$, and W designates the instantaneous power available from the rotorcraft.

On this basis, and initially, a predictive term is determined that is applicable to the instantaneous vertical speed $\underline{v}$ and that is given by:

$$C_{P1} = (v + k)\frac{V_{PP} - V_P}{2V_Y - V_{PP}}$$

In the context of this first correction, it is possible optionally to provide a second operation during a step b'1) of weighting the predictive term by means of a first weighting coefficient A that has been determined by testing relating to each type of rotorcraft. This first weighting coefficient is generally close to unity.

The weighted predictive term CPP1 is thus written:

$$C_{PP1} = A \times C_{P1}$$

In theory there is no need to include this first weighting coefficient, since it is theoretically equal to unity.

However, specific rotorcraft may depart a little from theory. Consequently, the invention allows for testing to determine a value for this first weighting coefficient, which value may differ slightly form unity.

The sign "×" corresponds to the multiplication symbol.

Under such conditions, the first correction to the measured instantaneous vertical speed $\underline{v}$ is equal either to the predictive term $C_{P1}$ or to the weighted predictive term $C_{PP1}$.

It is important to observe that this first correction ($C_{P1}$ or $C_{PP1}$) is applicable only providing the following two conditions are satisfied:

the calibrated airspeed VC in level flight is less than the minimum lower speed $V_Y$ which is close to 65 kt; and the calibrated airspeed VC is decreasing.

The method of the present invention may further comprise, during step b), a step b2) during which a second correction is determined for the instantaneous vertical speed $\underline{v}$.

More precisely, this second correction is for compensating any erroneous interpretations of the readouts given by a vertical speed indicator. Given the above explanations, the idea is to eliminate very short-term variations in vertical speed as given by a vertical speed indicator, since such variations are due to nose-up variations in the attitude of the aircraft and not to any assumed effect of air flow uplift. In other words, this correction seeks to prevent the pilot believing that the rotorcraft can continue to gain altitude at the displayed power.

The second correction results from the energy balance that is assumed to be constant during the reduction in the speed of the rotorcraft while going down from the minimum-power speed VY to hovering flight.

This energy balance is then expressed as follows, where CT is a constant:

$$\frac{1}{2}mV_P^2 + mgh + \int W_n + \int W = CT$$

in which m, h, and g designate respectively the mass of the aircraft, its flying altitude, and the acceleration due to gravity.

Under such circumstances, and assuming that the powers W and $W_n$ remain constant, differentiating the above expression leads to the following relationship where $\underline{t}$ represents time:

$$\frac{dh}{dt} = -V_P\frac{dV_P}{dt}$$

On this basis, and initially, a corrective term is determined that is applicable to the vertical speed and that is given by:

$$C_{P2} = V_P\frac{dV_P}{dt}$$

which by definition opposes the altitude variation $$\frac{dh}{dt}$$

of the rotorcraft.

Under such conditions, the instantaneous acceleration of the aircraft $$\frac{dV_P}{dt}$$

is advantageously obtained from an acceleration measurement, e.g. produced by an accelerometer arranged along the longitudinal axis of the rotorcraft, since that is more accurate than the result obtained by processing pressure measurements at low speed.

In the context of this second correction, provision may optionally be made subsequently, during a step b2') to weight the corrective term by a second weighting coefficient B that is substantially equal to 0.5.

The weighted corrective term $C_{PP2}$ is then written:

$$C_{PP2} = B \times C_{P2}$$

The second weighting coefficient is set arbitrarily to 0.5. However, it can be refined by testing, depending on the desired sensitivity.

Consequently, the second correction of the measurement of the instantaneous vertical speed $\underline{v}$ is equal either to the corrective term, or to the weighted corrective term.

Insofar as firstly the first correction is applied alone, and secondly the first and second corrections are applied simultaneously, the corrective vertical speed vCORR always depends on the predictive term CP1 and takes one of the following forms:

$$v_{CORR} = C_{P1}$$

$$\text{or } v_{CORR} = C_{PP1}$$

$$\text{or } v_{CORR} = C_{P1} + C_{P2}$$

$$\text{or } v_{CORR} = C_{P1} + C_{PP2}$$

$$\text{or } v_{CORR} = C_{PP1} + C_{P2}$$

$$\text{or } v_{CORR} = C_{PP1} + C_{PP2}$$

Consequently, and depending on circumstances, the predictive vertical speed vAP, used in step c) and presented to the pilot is, given by:

$$v_{AP} = v + C_{P1}$$

$$\text{or } v_{AP} = v + C_{PP1}$$

$$\text{or } v_{AP} = v + C_{P1} + C_{P2}$$

$$\text{or } v_{AP} = v + C_{P1} + C_{PP2}$$

$$\text{or } v_{AP} = v + C_{PP1} + C_{P2}$$

$$\text{or } v_{AP} = v + C_{PP1} + C_{PP2}$$

Naturally, it is recalled that these predictive vertical speeds are made available to the pilot only when the following conditions are satisfied:
  the calibrated airspeed VC in level flight is lower than the speed $V_Y$ that is close to 65 kt; and
  the calibrated airspeed VC is decreasing.

Knowledge of these predictive vertical speeds enables the pilot of a rotorcraft to have predictive operational information available that require less analysis effort on the part of the pilot and that provide the comfort of an additional time margin. Consequently, this advantage serves to reduce the probability of needing to manage emergency situations in a hurry, and thereby greatly improves safety.

Preferably, the predictive proper speed $V_{PP}$ is given by the relationship:

$$V_{PP} = V_P + \frac{dV_P}{dt} \Delta t$$

with a time interval $\Delta t$ that is advantageously equal to 10 seconds.

This condition leads to writing the proper speed as predicted for 10 seconds hence as follows:

$$V_{P10} = V_P + \left(10 \times \frac{dV_P}{dt}\right)$$

By way of example, the predictive vertical speed for 10 seconds hence is then written as follows in the more general case:

$$v_{AP} = v + A\left[(v+k)\frac{V_{PP} - V_P}{2V_Y - V_{PP}}\right] + B\left(V_P \frac{dV_P}{dt}\right)$$

i.e. if $\Delta t = 10$ seconds:

$$v_{AP} = v + A(v_{10} - v) + B\left(V_P \frac{dV_P}{dt}\right)$$

where:

$$v_{10} = v + (v+k)\frac{V_{P10} - V_P}{2V_Y - V_{P10}}$$

$v_{10}$ being the predictive vertical speed $\bar{v}$ for 10 seconds hence, without taking account of the corrective term or of the weighted corrective term.

Determining the instantaneous proper speed $V_P$ in application of at least three implementations of the invention serves in particular to mitigate the loss of sensitivity at low speed of an airspeed indicator.

In a first embodiment of the invention, the instantaneous proper speed is measured using an instrument known as an omnidirectional air data system (ODAS), e.g. as used in military helicopters such as the UH60 or a similar device implemented on the "Dauphin™ Coast Guard" helicopter developed by the Applicant.

The device has two Pitot tubes placed on two opposite arms of a rotary antenna that is centered on the axis of rotation of the main rotor, above the plane of the blades.

Such a device presents sensitivity that is more or less constant and can provide both components of airspeed in the plane of rotation of the device, excluding the third component.

The second embodiment of the invention measures the speed of an aircraft, in particular a rotorcraft at low speed, by using the airspeed indicator described in document FR 06/07239 in the name of the Applicant.

That instrument comprises an arm rotating at constant speed and provided with two pressure probes, each disposed at a respective one of its ends, each probe having two pressure intakes disposed symmetrically about the plane of rotation of said arm, thus giving access to all three components of the speed relative to the air.

Consequently, with either of those two devices, such a pressure-measuring type of airspeed indicator is no longer a limiting factor in terms of measuring static and total pressures at low speeds, so the proper speed of the rotorcraft can be obtained with good accuracy while advancing at low speed.

The third embodiment of the invention is based on an assumption that the wind does not change in magnitude or in direction while the speed of the rotorcraft is slowing from the minimum-power speed VY down to hovering flight.

It is easy to determine wind speed at a calibrated airspeed faster than the minimum-power speed, since in that first speed regime, and as mentioned above, information from an airspeed indicator is reliable. An airspeed indicator thus gives the calibrated airspeed VC and the proper speed $V_P$ after making the barometric correction as follows:

$$V_P = \frac{VC}{\sqrt{\sigma}}$$

However, at low speeds (VC<$V_Y$) and with ordinary present-day equipment, the only reliable ground speed measurement that is presently available is that provided by a global positioning system (GPS). The speed $V_P$ can therefore no longer be the result of an air pressure measurement relating to the calibrated airspeed VC as delivered by an airspeed indicator.

In the invention, and under such circumstances, the wind $\vec{V_W}$ at the time the speed drops below $V_Y$ is determined by vector subtraction of the ground speed provided by the GPS from the speed $\vec{V_P}$ provided by the airspeed indicator measurement. The speed $\vec{V_W}$ is assumed to remain constant during the rotorcraft approach, during which approach its speed drops from $V_Y$ to zero, such that the proper speed $\vec{V_P}$ is then estimated as being equal to the vector sum $\vec{V_S}+\vec{V_W}$, where $\vec{V_S}$ is the instantaneous ground speed as obtained from the GPS throughout the second speed regime. The corresponding calibrated airspeed VC is thus equal to $V_P\sqrt{\sigma}$.

The proper speed $V_P$ of the rotorcraft is thus obtained regardless of its ground speed. Nevertheless, it should be observed that the proper speed $V_P$ as determined in this third embodiment of the invention is essentially two-dimensional because the ground speed provided by the GPS is likewise two-dimensional.

Advantageously, implementing the method in a rotorcraft makes it possible to become aware of the predictive vertical speed, thereby relieving the pilot and the crew (by providing better operating information and improved time comfort) and reducing the probability of any need to handle emergency situations in a hurry.

The invention also provides a predictive vertical speed indicator for obtaining a predictive vertical speed of a rotorcraft by implementing the above-described method, comprising:

first means for measuring the instantaneous vertical speed v of a rotorcraft;
second means for measuring the instantaneous proper airspeed $V_P$ of a rotorcraft; and
third means for calculating the predictive vertical speed $v_{AP}$ of a rotorcraft, the third means being connected firstly to the first and second means via respective first and second connections 11, 12.

Advantageously, the predictive vertical speed $v_{AP}$ delivered by the third means is displayed, via a third connection 13, on said first means.

Furthermore, and preferably, the first means is a conventional vertical speed indicator.

In addition, the second means is advantageously, but not exclusively, either an airspeed indicator as in the first two above-mentioned embodiments, or a GPS as in the third embodiment. With a GPS, the proper speed corresponds to the vector sum of the speed provided by the GPS and the wind speed obtained by taking the difference between the proper speed and the speed given by the GPS, whenever the calibrated airspeed is equal to or greater than the minimum-power speed.

The third means is a calculator delivering the predictive vertical speed $v_{AP}$ on the basis of the following information relating to the rotorcraft:
the instantaneous vertical speed;
the instantaneous proper speed; and
the values as determined for the minimum-power speed $V_Y$ and for a characteristic constant k, i.e. the characteristic constant described above in the context of the claimed method, which values are constant for a rotorcraft of a given type of rotorcraft, together with the above-described constants A and B.

In addition, the predictive vertical speed indicator of the invention advantageously and optionally includes fourth means for measuring the instantaneous acceleration of the rotorcraft.

The fourth means are connected to the third means via a connection 14.

Preferably, the fourth means combine an accelerometer arranged on the longitudinal axis of the rotorcraft.

BRIEF DESCRIPTION OF THE DRAWINGS

The invention and its advantages thus appear in greater detail in the context of the following description that shows preferred embodiments, given without any limiting character and with reference to the accompanying drawing, in which:
FIG. 1 is a block diagram of the device of the invention; and
FIG. 2 is a diagram summarizing the steps in performing the method of the invention.

Elements shown in more than one figure are given the same references in each of them.

MORE DETAILED DESCRIPTION

The predictive vertical speed indicator 1 shown diagrammatically in FIG. 1 and in accordance with the invention is for determining a predictive vertical speed $v_{AP}$ of a rotorcraft. The predictive vertical speed indicator 1 operates on the basis of first means 1' that are preferably constituted by a conventional vertical speed indicator and that present the pilot with the predictive vertical speed vAP on the readout 20 of the conventional vertical speed indicator.

To do this, the instantaneous vertical speed v, measured by the indicator 1' is transmitted via a first connection 11 to third means 3, namely a calculator, which after appropriate digital processing delivers, where required, a predictive vertical speed $v_{AP}$ that is transmitted over a third connection 13 to the readout 20, where it is displayed.

Furthermore, the predictive vertical speed indicator 1 also includes second means 2 for measuring the instantaneous proper airspeed VP of a rotorcraft, these second means being connected to the third means 3 via a second connection 12.

In three main embodiments of the invention, the second means 2 correspond to the following instruments:
either an omnidirectional air data system, in the first embodiment;
or an airspeed indicator as described in document FR 06/07239, in the second embodiment;
or else a GPS, such that if the calibrated airspeed VC of the rotorcraft is less than the minimum-power speed $V_Y$, then the proper airspeed $V_P$ of the rotorcraft corresponds to the vector sum of the ground speed $\vec{V_S}$ as supplied by the GPS and the wind speed $\vec{V_W}$ obtained by taking the difference between the proper airspeed given by an airspeed indicator and the speed given by the GPS when the calibrated airspeed VC is equal to the minimum-power speed $V_Y$, it being understood that $VC=V_P\sqrt{\sigma}$, where σ is equal to the relative density of ambient air (the quotient of the density ρ of the air at the altitude under consideration divided by the density of air $\rho_0$ at ground level in a "standard atmosphere").

Naturally, it is possible to envisage any other instrument for measuring proper airspeed, without thereby going beyond the ambit of the present invention.

Furthermore, the third means 3 contains in a memory predetermined values for the minimum-power speed $V_Y$ and a characteristic constant k, which values are constant for a rotorcraft of a given type of rotorcraft, together with the above-described constants A and B.

In addition, fourth means 4 are optionally needed to determine the instantaneous acceleration $$\frac{dV_P}{dt}$$

of the rotorcraft (where t=time). Preferably, but not exclusively, these means are constituted by an accelerometer placed on the longitudinal axis of the rotorcraft. The fourth means 4 are connected to the third means 3 via a fourth connection 14.

The vertical speed vAP delivered by the third means 3 is displayed on the readout 20 of the first means 1' via a third connection 13.

Under such conditions, said predictive vertical speed indicator 1 implements the method shown diagrammatically in FIG. 2.

Thus, the method of obtaining a predictive vertical speed vAP of a rotorcraft is remarkable wherein the following steps are performed in succession:

a) measuring the instantaneous vertical speed $\underline{v}$ of the rotorcraft;

b) determining a corrective vertical speed $v_{CORR}$; and c) adding the corrective vertical speed $v_{CORR}$ to the instantaneous vertical speed $\underline{v}$ to obtain said predictive vertical speed $v_{AP}$.

Advantageously, the instantaneous vertical speed $\underline{v}$ is measured by means of a vertical speed indicator 1'.

More precisely, during step b), in a step b1), a first correction is determined for the measured instantaneous vertical speed $\underline{v}$ as a function of the instantaneous proper airspeed $V_P$, the predictive proper airspeed $V_{PP}$, the minimum-power speed $V_Y$, the instantaneous vertical speed $\underline{v}$ as measured by the vertical speed indicator, and a constant $\underline{k}$ that is characteristic of the rotorcraft of a given type of rotorcraft.

This characteristic constant k is determined by testing and from a linear approximation that corresponds to a proportionality ratio between the powers and the vertical speed of the rotorcraft, independently of the mass of the rotorcraft, such that:

$$v = k\left(\frac{W}{W_n} - 1\right)$$

In this relationship, $W_n$ designates the power needed to fly level at the proper airspeed $V_P$, and W is the instantaneous available power of the rotorcraft.

This first correction is applicable only when the following two conditions are satisfied:

the calibrated airspeed VC in level flight is less than the speed $V_Y$ which is close to 65 kt; and the calibrated airspeed VC is decreasing.

On this basis, and initially, a predictive corrective term $C_{P1}$ applicable to the vertical speed $\underline{v}$ is determined, as given by:

$$C_{P1} = (v+k)\frac{V_{PP} - V_P}{2V_Y - V_{PP}}$$

In the context of this first correction, provision may optionally be made during a step b'1) subsequently to weight the predictive term $C_{P1}$ by a first weighting coefficient A as determined by testing and specific to each type of rotorcraft. This first weighting coefficient is generally close to unity.

The weighted predictive term $C_{PP1}$ is thus written:

$$C_{PP1} = A \times C_{P1}$$

Under such conditions, the first correction to the instantaneous vertical speed measurement $\underline{v}$ is equal either to the predictive term $C_{P1}$ or to the weighted predictive term $C_{PP1}$.

The method of the present invention may further comprise, during step b), a step b2) during which a second correction is determined for the instantaneous vertical speed $\underline{v}$.

On this basis and initially, a corrective term $C_{P2}$ applicable to the vertical speed $\underline{v}$ is determined from the following relationship, where $\underline{t}$ designates time:

$$C_{P2} = V_P \frac{dV_P}{dt}$$

which by definition is opposite to the change in altitude $$\frac{dh}{dt}$$

of the rotorcraft if the power balance is assumed momentarily to be equal to a constant CT in compliance with the following relationship:

$$\frac{1}{2}mV_P^2 + mgh + \int W_n + \int W = CT$$

the first two expressions designating respectively the kinetic energy and the potential energy of the rotorcraft.

In the context of this second correction, provision may optionally be made subsequently, during a step b2'), to weight the corrective term $C_{P2}$ by a second weighting coefficient B that is substantially equal to 0.5.

The weighted corrective term $C_{PP2}$ is thus written as follows:

$$C_{PP2} = B \times C_{P2}$$

Consequently, the second correction to the measured instantaneous vertical speed $\underline{v}$ is equal either to the corrective term $C_{P2}$ or to the weighted corrective term $C_{PP2}$.

Insofar as firstly the first correction is applied alone and secondly the first and second corrections are applied simultaneously, the corrective vertical speed $v_{CORR}$ satisfies one of the following formulae:

$$v_{CORR} = C_{P1}$$

or $v_{CORR} = C_{PP1}$ or $v_{CORR} = C_{P1} + C_{P2}$ or $v_{CORR} = C_{P1} + C_{PP2}$ or $v_{CORR} = C_{PP1} + C_{P2}$ or $v_{CORR} = C_{PP1} + C_{PP2}$

Consequently, and depending on circumstances, the predictive vertical speed $v_{AP}$ used in step c) and presented to the pilot is either:

$v_{AP}=v+C_{P1}$ or $v_{AP}=v+C_{PP1}$ or $v_{AP}=v+C_{P1}+C_{P2}$ or $v_{AP}=v+C_{P1}+C_{PP2}$ or $v_{AP}=v+C_{PP1}+C_{P2}$ or $v_{AP}=v+C_{PP1}+C_{PP2}$

Preferably, the predictive proper airspeed $V_{PP}$ is determined by the relationship:

$$V_{PP} = V_P + \frac{dV_P}{dt}\Delta t$$

with a time interval $\Delta t$ advantageously equal to 10 seconds.

This condition leads to writing the proper airspeed forecast for 10 seconds hence as follows:

$$V_{P10} = V_P + \left(10 \times \frac{dV_P}{dt}\right)$$

By way of example, the vertical speed predicted for 10 seconds hence is then written as shown below in the most general case:

$$v_{AP} = v + A\left[(v+k)\frac{V_{PP} - V_P}{2V_y - V_{PP}}\right] + B\left(V_P\frac{dV_P}{dt}\right)$$

i.e. if $\Delta t=10$ seconds:

$$v_{AC} = v + A(v_{10} - v) + B\left(V_P\frac{dV_P}{dt}\right)$$

where:

$$v_{10} = v + (v+k)\frac{V_{P10} - V_P}{2V_y - V_{P10}}$$

$v_{10}$ being the vertical speed $v$ predicted for 10 second hence.

Naturally, the present invention can be subjected to numerous variations as to its implementation. Although several embodiments are described above, it will readily be understood that it is not conceivable to identify exhaustively all possible embodiments. It is naturally possible to envisage replacing any of the means described by equivalent means without going beyond the ambit of the present invention.

In order to improve the predictive speed precision, a specific fly-test is executed with the concerned rotorcraft, of a specific type, to determine precisely the first and second weighting coefficient A and B, instead of setting them with arbitrary values, 1 and 0.5 for example.

In practice, and according to a preferred protocol, said concerned rotorcraft moving noticeably at the minimum-power speed $V_y$, and possibly in the process of evolutions at non-null instantaneous vertical speed, a test consists to reduce, from an instantaneous proper airspeed $V_P$ lower or equal than the minimum speed at a first time t, this forward speed of rotorcraft, always maintaining if possible the engine power constant. Moreover, the test is repeated by imposing to the rotorcraft in each test a level almost constant of deceleration, being understood that, on the one hand said level of deceleration can be modified from one test to another, and on the other hand many tests can be executed on a same level of deceleration, or from different instantaneous proper speed $V_P$ at time t.

Every level of deceleration is obtained by a longitudinal movement of the rotorcraft cyclic handle toward the rear end of the rotorcraft by the pilot. In these conditions, the result is a slope angle of the swashplate, and thus of the rotation plane of the rotor, in the pull-up direction towards the front of the rotorcraft.

This action imposes a deceleration to the concerned rotorcraft.

Besides, every test is followed by a time period of at least 10 seconds that is to say up to a second time (t+10 seconds), this period of 10 seconds being preferentially accepted to protect the predictive proper speed $V_{PP}$ then written as $V_{P10}$.

During every test, quantities measurements are recorded during at least 10 seconds as follows:
  the instantaneous vertical speed v, at the beginning of the test at the first time t,
  the vertical speed v at the second time (t+10 seconds) equal de facto to the predictive vertical speed $V_{AP}$ at the second time (t+10 seconds),
  the instantaneous proper speed $V_P$ at the first time t,
  the deceleration $$\frac{dV_P}{dt}$$

knowing that quantities $V_y$ and k are known as characteristics of said type of rotorcraft.

As a result, terms $C_{p1}$ and $C_{p2}$ are calculated for each test so that for each test it is established an equation like:

$(A \times C_{p1}) + (B \times C_{p2}) = V_{AP} - v$ where $V_{AP}$ is equal to the vertical speed v measured at the second time (t+10 seconds), and
v is equal to the vertical speed v measured at the first time (t).

Therefore, there are as many equations as tests; the system of equations resulting being solved by classical numerical methods which is not necessary to describe presently.

The solution to this system of equations thus enables to obtain the first and second weighting coefficients A and B.

These weighting coefficients can be used equally with the help of the following relations, previously described, according to the considered species case:

$V_{AP}=v+C_{PP1}$ (coefficient A only one used)

$V_{AP}=v+C_{PP2}$ (coefficient B only one used)

$V_{AP}=v+C_{P1}+C_{PP2}$ (coefficient B only one used)

$V_{AP}=v+C_{PP1}+C_{P2}$ (coefficient A only one used)

$V_{AP}=v+C_{PP1}+C_{PP2}$ (coefficients A et B used)

What is claimed is:

1. A method of obtaining a predictive vertical speed $v_{AP}$ of a rotorcraft, wherein the following steps are performed in succession:

measuring an instantaneous vertical speed v of a rotorcraft using a vertical speed indicator connected to the rotorcraft;

measuring an instantaneous proper airspeed of the rotorcraft using at least one of an omnidirectional air data system in communication with the rotorcraft, an airspeed indicator connected to the rotorcraft, and a global positioning system in communication with the rotorcraft;

determining a corrective vertical speed $v_{CORR}$ depending on a predictive term $C_{P1}$; and adding the corrective vertical speed $v_{CORR}$ to the instantaneous vertical speed v to obtain a predictive vertical speed $v_{AP}$ of the rotorcraft; and wherein said predictive term $C_{P1}$ is determined as follows:

$$C_{P1} = (v+k)\frac{V_{PP}-V_P}{2V_Y-V_{PP}}$$

where:

$V_P$=the instantaneous proper airspeed of the rotorcraft;

$V_{PP}$=the predictive proper airspeed of the rotorcraft as determined using the following formula where t and $\Delta t$ designate respectively time and a time interval:

$$V_{PP} = V_P + \frac{dV_P}{dt}\Delta t$$

$V_Y$=the minimum-power speed of the rotorcraft which is dependent upon a given type of the rotorcraft; and k=a predetermined characteristic constant of the rotorcraft, determined from a linear approximation that corresponds to a proportionality ratio between powers and vertical speed of the rotorcraft.

2. A method according to claim 1, further comprising determining a weighted predictive term $C_{PP1}$, where A is a first weighting coefficient, such that:

$$C_{PP1}=A \times C_{P1}.$$

3. A method according to claim 2, wherein the first weighting coefficient A is close to 1.

4. A method according to claim 2, wherein the corrective vertical speed $v_{CORR}$ is equal to the weighted predictive term $C_{PP1}$, such that the predictive vertical speed $v_{AP}$ is given by:

$$v_{AP}=v+C_{PP1}.$$

5. A method according to claim 1, wherein the corrective vertical speed $v_{CORR}$ is equal to the predictive term $C_{P1}$ such that the predictive vertical speed $v_{AP}$ is given by:

$$v_{AP}=v+C_{P1}.$$

6. A method according to claim 1, wherein determining the corrective vertical speed $v_{CORR}$ includes determining the corrective vertical speed $v_{CORR}$ depending on the predictive term $C_{P1}$ and a corrective term $C_{P2}$, wherein the corrective term $C_{P2}$ is determined as follows:

$$C_{P2} = V_P\frac{dV_P}{dt}$$

where $V_P$ designates the instantaneous proper airspeed of the rotorcraft and $$\frac{dV_P}{dt}$$

its instantaneous acceleration, t being time.

7. A method according to claim 6, wherein the corrective vertical speed $v_{CORR}$ is equal to summing the corrective term $C_{P2}$ and the predictive term $C_{P1}$ such that the predictive vertical speed $v_{AP}$ is equal to:

$$v_{AP}=v+C_{P1}+C_{P2}.$$

8. A method according to claim 6, wherein the corrective vertical speed $v_{CORR}$ is equal to summing the corrective term $C_{P2}$ and a weighted predictive term $C_{PP1}$ so that the predictive vertical speed $v_{AP}$ is given by:

$$v_{AP}=v+C_{PP1}+C_{P2}.$$

9. A method according to claim 6, further comprising determining a weighted corrected term $C_{PP2}$, where B is a second weighting coefficient, as follows:

$$C_{PP2}=B \times C_{P2}.$$

10. A method according to claim 9, wherein the second weighting coefficient B is substantially equal to 0.5.

11. A method according to claim 9, wherein the corrective vertical speed $v_{CORR}$ is equal to summing the predictive term $C_{P1}$ and the weighted corrective term $C_{PP2}$ such that the predictive vertical speed $v_{AP}$ is given by:

$$v_{AP}=v+C_{P1}+C_{PP2}.$$

12. A method according to claim 9, wherein the corrective vertical speed $v_{CORR}$ is equal to summing the weighted predictive term $C_{PP1}$ and the weighted corrective term $C_{PP2}$ such that the predictive vertical speed $v_{AP}$ is given by:

$$v_{AP}=v+C_{PP1}+C_{PP2}.$$

13. A method according to claim 1, wherein the time interval $\Delta t$ is substantially 10 seconds.

14. A method according to claim 1, wherein the acceleration $$\frac{dV_P}{dt}$$

is measured using an accelerometer arranged on the longitudinal axis of the rotorcraft.

15. A method according to claim 1, wherein airspeed indicator has an arm rotating at constant speed, provided with two pressure probes each disposed at a respective one of the ends of said arm, each probe having two pressure intakes arranged symmetrically relative to the plane of rotation of the arm.

16. A method according to claim 1, wherein if the calibrated airspeed VC of the rotorcraft is less than the minimum-power speed $V_Y$, the proper airspeed $V_P$ of said rotorcraft is calculated by obtaining the vector sum of the ground speed $\vec{V_S}$ as supplied by the global positioning system and the wind speed $\vec{V_W}$ as obtained by taking the difference between the proper airspeed given by an airspeed indicator and the speed given by the global positioning system when the calibrated airspeed VC is equal to the minimum-power speed $V_Y$.

17. A method according to claim 1, wherein the predictive vertical speed $v_{AP}$ is indicated to the pilot using the vertical speed indicator transformed into a predictive vertical speed indicator.

18. A predictive vertical speed indicator system for obtaining a predictive vertical speed $v_{AP}$ of a rotorcraft, the predictive vertical speed indicator system comprising:
- a vertical speed indicator for measuring an instantaneous vertical speed v of a rotorcraft;
- a device for measuring an instantaneous proper airspeed $V_P$ of the rotorcraft, wherein the device includes at least one of an omnidirectional air data system in communication with the rotorcraft, an airspeed indicator connected to the rotorcraft, and a global positioning system in communication with the rotorcraft; and
- a processor for calculating a predictive vertical speed $v_{AP}$ of the rotorcraft, the processor being connected to the vertical speed indicator and the device and containing in memory predetermined values for the minimum-power speed $V_Y$ of the rotorcraft and a characteristic constant k which are both constants relating to said rotorcraft and are dependent upon a given type of the rotorcraft; and
- the processor delivering the predictive vertical speed in particular on the basis of the following information relating to the rotorcraft:
  - the instantaneous vertical speed of the rotorcraft;
  - the instantaneous proper airspeed of the rotorcraft;
  - the predetermined minimum-power speed $V_Y$ of the rotorcraft; and
  - the predetermined characteristic constant k of the rotorcraft.

19. A predictive vertical speed indicator system according to claim 18, comprising an accelerometer connected to the processor in order to measure the instantaneous acceleration $$\frac{dV_P}{dt}$$

of said rotorcraft.

20. A predictive vertical speed indicator system according to claim 19, wherein the accelerometer is arranged along the longitudinal axis of the rotorcraft.

21. A predictive vertical speed indicator system according to claim 18, wherein the predictive vertical speed $v_{AP}$ delivered by the processor is displayed on a readout of said vertical speed indicator.

22. A predictive vertical speed indicator system according to claim 18, wherein the device is an airspeed indicator comprising an arm rotating at constant speed, provided with two pressure probes, each disposed at a respective one of the ends of said arm, each probe having two pressure intakes disposed symmetrically about the plane of rotation of the arm.

23. A predictive vertical speed indicator system according to claim 18, wherein the device is a global positioning system such that if the calibrated airspeed VC of the rotorcraft is less than the minimum-power speed $V_Y$, the proper airspeed $V_P$ of said rotorcraft corresponds to the vector sum of the ground speed $\vec{V_S}$ provided by the global positioning system and the wind speed $\vec{V_W}$ obtained by taking the difference between the speed given by an airspeed indicator and the speed given by the global positioning system when the calibrated airspeed VC is equal to the minimum-power speed $V_Y$.

24. A predictive vertical speed indicator system according to claim 18, wherein the processor delivers the vertical speed from the following further information relating to the rotorcraft:
- the instantaneous acceleration of the rotorcraft.

* * * * *